Feb. 21, 1956 W. M. WEBSTER, JR 2,735,977
INVERTER CIRCUIT
Filed Oct. 31, 1952
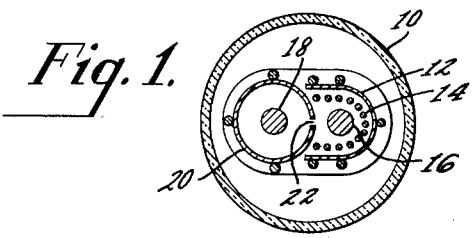
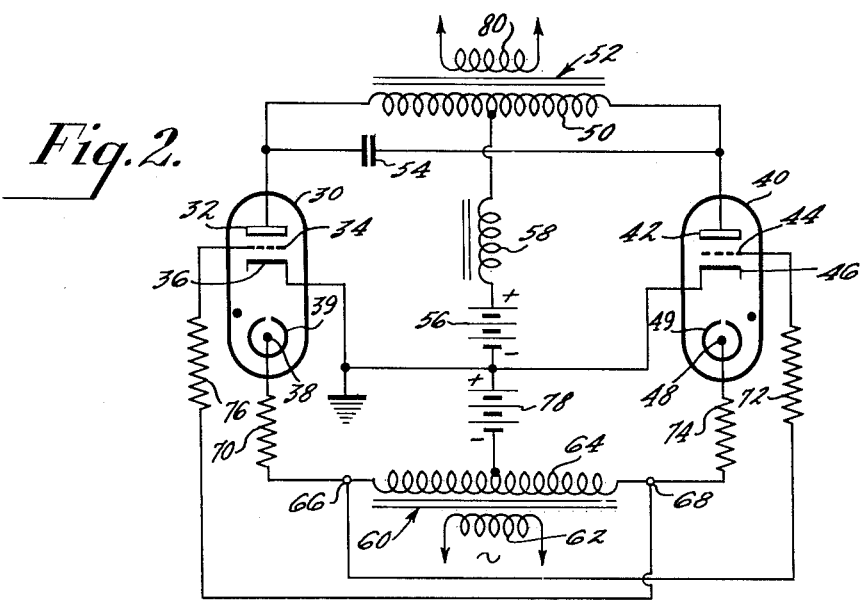
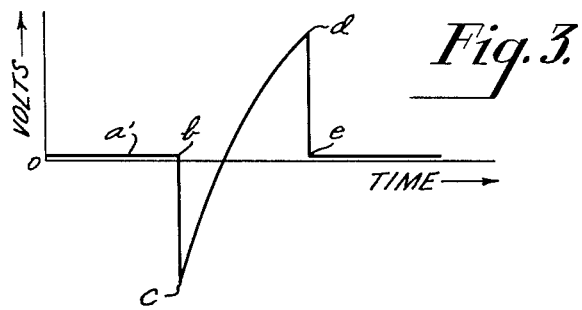
INVENTOR.
*William M. Webster, Jr.*
BY *Morris␣* ␣
ATTORNEY

2,735,977
INVERTER CIRCUIT

William M. Webster, Jr., Princeton, N. J., assignor, by mesne assignments, to the United States of America as represented by the Secretary of the Army Application October 31, 1952, Serial No. 317,963

11 Claims. (Cl. 321—36)

This invention relates to inverter circuits of the type used to convert D. C. electrical energy into A. C. electrical energy, and more particularly to a novel inverter circuit employing gaseous electron tubes. While not specifically related thereto, the inverter circuit of the present invention is particularly applicable for efficiently converting the low D. C. voltage supplies in automobiles, airplanes, tanks and the like into relatively high A. C. voltages.

The main source of D. C. voltage in automobiles, airplanes and tanks is a battery having a voltage output range from about 6 volts to about 28 volts. It is often necessary to convert this relatively low unidirectional voltage into an alternating voltage in order to operate certain types of equipment requiring an A. C. voltage input, as for instance 110 volts A. C. Inverter circuits employing thyratron tubes have been used to obtain the desired conversion of A. C. power to D. C. power. An objection, however, to the use of inverter circuits employing thyratron tubes is the fact that the efficiency of these circuits is relatively low because of the power loss resulting from the voltage drop across the thyratron tubes when they are conducting.

If a thyratron inverter circuit is used to convert a unidirectional voltage of 28 volts, for example, into an A. C. voltage, it can be shown that the maximum tube efficiency will be $$\left(1-\frac{10}{28}\right)=64$$

percent, where the arc drop across the thyratron tube is 10 volts. In a copending application by E. O. Johnson, Serial No. 185,745, filed September 20, 1950, and assigned to the assignee of the present invention, there is desired and claimed a gaseous electron tube in which the function of supplying energy to provide a space charge neutralizing plasma and the function of providing a field to draw work current are separated. Since the arc drop across the latter gaseous tube is in the neighborhood of two volts when it is conducting, it can be shown that the maximum efficiency of this type of tube will be $$100\left(1-\frac{2}{28}\right)=93$$

percent. It is, therefore, evident that the efficiency of the inverter circuits using gas tubes is approximately inversely proportional to the voltage drop across the tube while it is conducting, other things being equal. In accordance with the present invention, the electrodes controlling the functions referred to above are biased and provided with operating voltages in a novel manner.

It is, therefore, an important object of the present invention to provide a novel and highly efficient inverter circuit employing gas tubes of the type described.

It is a further object of the present invention to provide an improved inverter circuit, employing gas type tubes, particularly adapted to convert a low unidirectional voltage into a relatively higher A. C. voltage with a minimum power loss in the tubes.

It is still a further object of the present invention to provide a novel inverter circuit of the parallel-circuit type, employing gaseous tubes of the type described, which is simple and positive in operation, and highly efficient in use.

These and further objects of the present invention are attained in an inverter circuit employing gaseous discharge tubes of the type described, wherein the working function and the ionization function of the tubes are separated. In accordance with the present invention, a pair of gaseous tubes each having an anode, a grid, a main cathode, an auxiliary cathode, and a garrote or constricting electrode are connected in a parallel-type inverter circuit. A source of unidirectional voltage, which is to be converted into an A. C. voltage is connected in the anode-main cathode circuit of each tube. An input transformer is provided to drive both the auxiliary cathode and the grid of each tube to fire each tube alternately with respect to the other; that is, in a cyclical order. The grid and the auxiliary cathode of each tube are cross coupled to opposite ends of the secondary winding of the input transformer in order to provide the proper phase relationship for firing the tubes alternately. The novel features of the invention, as well as the invention itself, both as to its organization and method of operation will be understood in detail from the following description when considered in connection with the accompanying drawing in which:

Fig. 1 is a cross-sectional view of a gaseous electron tube utilized in the present invention;

Fig. 2 is a circuit diagram of an inverter circuit in accordance with the present invention; and Fig. 3 is a graph used to explain the inverter circuit of the present invention.

Referring now to Fig. 1, there is shown a cross-sectional view of a gas tube utilized in the present invention. A tube envelope 10 contains a U-shaped anode 12 of sheet metal which is disposed externally to and in juxtaposed position with a control grid 14 having relatively coarse spacing. A main cathode 16 is maintained within and partially surrounded by the control grid 14 and the anode 12. An auxiliary cathode 18, laterally spaced from the main cathode 16, is maintained coaxially with respect to a slotted cylindrical restricting electrode, or garrote 20. An elongated, narrow slot 22 in the constricting electrode 20 extends along a plane through the axes of the auxiliary and main cathodes. This structure permits a desired degree of ionization to be obtained between the auxiliary and main cathodes with a considerable minimization of power required to sustain ionization within the tube. The anode 12 and the main cathode 16 of the tube provide the load circuit through which load currents can be passed substantially in the manner of conventional tubes. These load currents may be controlled by the potential applied to the control grid 14. The auxiliary cathode 18 is an additional electrode for cooperation with the anode 12 and/or the main cathode 16 to provide for the ionization of the gas in the tube. The envelope 10 is filled with an ionizable gas, such as helium or xenon.

This gaseous electron tube is completely shown, described and claimed in the above-mentioned, copending application by E. O. Johnson. Ionization or breakdown of the gas occurs between the auxiliary cathode and the main cathode and/or the anode of the tube. There is thus provided within the gas envelope a plasma which acts as an excellent conductor and which provides a low resistance path between the anode and the main cathode of the tube. The density of the plasma generated in the tube is controlled at least in part by the amount of current flowing through the ionization circuit. Accordingly, the effective resistance between the main cathode 16 and the anode 12 may be controlled effectively by controlling the current flow in the ionization circuit. Alternately, the load current may be controlled by the potential applied to the control grid 14 interposed between the main cathode and the anode. The characteristics of the type of gaseous tube utilized are such that a relatively small change in the ionization current is effective to produce a relatively large change in the load circuit.

Referring now to Fig. 2 of the drawings, there is shown a circuit diagram of a parallel-type inverter system in accordance with the present invention employing two electron tubes 30, 40 of the type described above. The tubes 30, 40 comprise, respectively, anodes 32, 42, grids 34, 44, main cathodes 36, 46, auxiliary cathodes 38, 48, and garrotes or constricting electrodes 39, 49. The anodes 32, 42 of the tubes 30, 40, respectively, are connected to each other through the primary winding 50 of an output transformer 52. The anodes 32, 42 are also connected to each other through a commutating capacitor 54. The main cathodes 36, 46 of the tubes 30, 40, respectively, are connected to each other and to a point of reference potential, such as ground. A source of unidirectional voltage 56 has its negative terminal connected to the cathodes 36, 46 of the tubes 30, 40, and its positive terminal connected to a center tap on the primary winding 50 of the ouput transformer 52, through a smoothing choke 58.

An A. C. voltage arrangement is provided to fire the tubes alternately. To this end, an input transformer 60 is provided. The primary 62 of the input transformer 60 is adapted to be connected across any conventional source of alternating current (not shown). A center-tapped secondary 64 of the transformer 60 has two output terminals 66, 68 for applying a transformed voltage to the tubes 30, 40 in order to fire them alternately. The auxiliary cathode 38 of the tube 30 is connected to the output terminal 66 of the secondary winding 64 through a current limiting resistor 70. The output terminal 66 of the secondary winding 64 is also connected to the grid 44 of the tube 40 through a current limiting resistor 72. In a similar manner, the output terminal 68 of the secondary winding 64 is connected to the auxiliary cathode 48 of the tube 40 through a current limiting resistor 74, and to the grid 34 of the tube 30 through a current limiting resistor 76. Thus, it is seen that the grid and the auxiliary cathode of each tube are cross connected to opposite ends of the secondary winding 64 of the input transformer 60 in order to provide the proper phase relationship for firing the tubes 30, 40, alternately. A source of unidirectional voltage 78, having its positive terminal connected to the main cathodes 36, 46 and its negative terminal connected to the center tap of the secondary winding 64 of the input transformer 60, is provided to bias the grids and auxiliary cathodes of the tubes 30, 40 negatively with respect to their main cathodes 36, 46.

The operation of the inverter circuit illustrated in Fig. 2 will now be described. The unidirectional voltage source 56 represents the source of voltage to be converted into an A.-C. voltage. An alternating voltage from any conventional and convenient source (not shown) is applied across the primary winding 62 of the input transformer 60. Let it be assumed that the tube 40 is conducting current through its anode-main cathode circuit, and that the tube 30 is in a non-conducting state. Let it be assumed further that the input alternating voltage across the primary 62 is of a polarity momentarily such as to produce a transformed negative-going voltage at the terminal 66 and a positive-going voltage at the terminal 68 of the input transformer 60. The negative-going voltage at the terminal 66 is applied to the grid 44 of the tube 40, and thus acts as a means of preventing conduction in the tube 40. The negative-going voltage at the auxiliary cathode 38 of the tube 30 is now sufficiently negative with respect to the main cathode 36 to produce an ionization discharge between the auxiliary cathode 38 of the main cathode 36. As a result of the ionization discharge, the tube 30 will be fired, that is, it will allow current to pass therethrough. It is noted that the grid 34 of the tube 30 has a positive-going voltage applied to it at the time of the ionization discharge. The grid 34, therefore, acts as an additional triggering voltage to cause conduction through the tube 30. When the tube 30 is fired, as explained, the voltage at the anode 32 drops to about one or two volts above the potential of the main cathode 36. This negative-going voltage, at the anode 32 of the tube 30, is applied to the anode 42 of the tube 40, through the commutating capacitor 54, and serves as an additional means of cutting off conduction through the tube 40.

The tube 30 will continue to conduct until the transformed voltage at the terminal 66 goes positive, and the transformed voltage at the terminal 68 goes negative. Under these latter conditions, the ionization discharge between the auxiliary cathode 38 and the main cathode 36 of the tube 30 is cut off. The negative-going grid 34 also helps to prevent conduction through the tube 30. The negative-going auxiliary cathode 48 and the positive-going grid 44 of the tube 40 cause conduction to take place through the tube 40. Consequently, the voltage at the anode 42 of the tube 40 drops, and is transmitted to the anode 32 of the tube 30 through the commutating capacitor 54. This latter negative-going voltage aids in cutting off conduction through the tube 30. The voltage waves appearing across the primary winding 50 of the output transformer 52, as a result of the current flowing through each of the tubes 30, 40, are 180° out of phase with each other, and appear across the secondary winding 80 of the output transformer 52 as a transformed continuous wave having the shape and characteristics of a good sine wave.

It has been found that satisfactory results are obtained with the inverter circuit, as shown and described, regardless of whether or not the constricting electrodes 39, 49 are connected to the auxiliary cathodes 38, 48, of the tubes 30, 40, respectively. The presence, however, of a constricting electrode in each gas tube is desirable since it causes a high efficiency of ionization. It is noted that if the tubes 30, 40 were to act as pure thyratrons, the voltage drop across them would be at least in the order of 10 volts. By using gas tubes of the type described, having additional electrodes in the form of auxiliary cathodes and constricting electrodes, and by using circuitry in accordance with the present invention, the voltage drop across the gas tubes can be reduced to about one or two volts when they are conducting.

Understanding of the operation of the inverter circuit described and illustrated in Fig. 2 is aided by referring to Fig. 3. The curve of Fig. 3 represents the voltage at the anode of one of the gas tubes with respect to time. If it is assumed that the tube 30 is fired when the time equals zero, the portion $a'$ of the curve represents the voltage at the anode 32 while the tube 30 is conducting. When the tube 40 is fired, as when its auxiliary cathode 48 goes negative and its grid 44 goes positive, the tube 30 is cut off. The negative-going voltage at the anode 42 of the tube 40, when the tube 40 is fired, is applied to the anode 32 of the tube 30 through the commutating capacitor 54. This negative-going voltage drives the voltage at the anode 32 of the tube 30 from the point $b$ to the point $c$ on the curve of Fig. 3. The tube 30 is now cut off. The potential at the anode 32 will now rise to the point $d$ at a rate determined by the circuit parameters comprising the values of the capacitor 54, the smoothing choke 58, and the reflected load impedance in the primary 50 of the transformer 52. When the tube 30 is fired, as when its grid 34 goes positive and its auxiliary cathode 38 goes negative, the voltage at the anode 32 will drop to the point e. This completes a cycle of the anode voltage 32 of the tube 30. The anode 42 of the tube 40 goes through the same chain of events except that it is 180° out of phase with the voltage at the anode 32 of the tube 30. The two wave forms of anode potential are combined in the output transformer 52 and a good sine wave appears across the secondary 80 of the output transformer 52.

There has been shown and described above, in accordance with the present invention, a novel, useful, and highly efficient inverter system which employs gaseous electron tubes and which provides a high current low impedance output. The efficiency of the inverter system is extremely high because the circuitry provides for means to produce an auxiliary discharge simultaneously with the firing of the gas tubes. In this manner, the power loss by the voltage drop across the gas tubes is reduced to a minimum. Since the inverter circuit described herein provides means to minimize the loss in the gas tubes, the circuit may be used efficiently to convert energy from relatively low D. C. voltage sources into A. C. energy.

What is claimed is:

1. An inverter circuit comprising a first and a second gas tube each having an anode, a grid, a main cathode, an auxiliary cathode, and a constricting electrode surrounding a portion of said auxiliary cathode, output means coupled to said anodes, means including a portion of said output means to apply a source of unidirectional voltage between the main cathode and anode of each of said tubes, and A. C. input means coupled to said auxiliary cathodes and to said grids to apply alternately voltages of one polarity to the auxiliary cathode of said first tube and to the grid of said second tube, and voltages of an opposite polarity to said one polarity to the grid of said first tube and to the auxiliary cathode of said second tube, whereby said first and second tubes are fired alternately.

2. An inverter circuit comprising a first and a second gas tube each having an anode, a grid, a main cathode, an auxiliary cathode, and a constricting electrode surrounding a portion of said auxiliary cathode, output means coupled to said anodes, a capacitor connected between said anodes, means including a portion of said output means to apply a source of unidirectional voltage between the anode and main cathode of each of said tubes, A. C. input means having two output terminals, one of said output terminals being connected to the auxiliary cathode of said first tube and to the grid of said second tube, and the other of said output terminals being connected to the auxiliary cathode of said second tube and to the grid of said first tube.

3. An inverter circuit comprising a first and a second gas tube each having an anode, a grid, a main cathode, an auxiliary cathode, and a constricting electrode surrounding a portion of said auxiliary cathode, an output transformer coupled to said anodes, a capacitor connected between said anodes, means including a portion of said output transformer to apply a source of unidirectional voltage between the anode and main cathode of each of said tubes, an input transformer having primary and secondary windings, one end of said secondary winding being connected to the auxiliary cathode of said first tube and to the grid of said second tube, and the other end of said secondary winding being connected to the auxiliary cathode of said second tube and to the grid of said first tube.

4. An inverter circuit comprising a first and second gas tube each having an anode, a grid, a main cathode, an auxiliary cathode, and a constricting electrode partially surrounding said auxiliary cathode, an output transformer having a center-tapped primary and secondary windings, said anodes being connected to each other through said center-tapped primary winding, a capacitor connected between said anodes, said cathodes being connected to each other, means to apply a source of unidirectional voltage between said cathodes and the center tap on said center-tapped primary, an input transformer having a primary and a center-tapped secondary winding, means to apply a second source of voltage between said cathodes and the center tap on said center-tapped secondary winding, one end of said center-tapped secondary winding being coupled to said auxiliary cathode of said first tube and to the grid of said second tube, and the other end of said center-tapped secondary winding being coupled to the auxiliary cathode of said second tube and to the grid of said first tube.

5. An inverter circuit as defined in claim 4 wherein said constricting electrode is connected to said auxiliary cathode.

6. In an inverter circuit of the type employing a first and a second gas tube each having an anode, a grid, and a main cathode, and means to apply a source of unidirectional voltage in circuit with the anode and the main cathode of each of said tubes; the improvement comprising an auxiliary cathode and a constricting electrode partially surrounding said auxiliary cathode in each of said tubes, and means to fire said tubes alternately, said last-mentioned means comprising A. C. voltage means having two output terminals, one of said output terminals being connected to the auxiliary cathode of said first tube and to the grid of said second tube, and the other of said output terminals being connected to the auxiliary cathode of said second tube and to the grid of said first tube.

7. An inverter circuit as defined in claim 6 wherein said auxiliary cathode is connected to said constricting electrode.

8. In an inverter circuit of the type employing a first and a second gas tube each having an anode, a grid, and a main cathode, and means to apply a source of unidirectional voltage in circuit with the anode and the main cathode of each of said tubes; the improvement comprising an auxiliary cathode and a constricting electrode surrounding a portion of said auxiliary cathode in each of said tubes, an input transformer comprising a secondary winding, said secondary winding having one end connected to the auxiliary cathode of said first tube and to the grid of said second tube, the other end of said secondary winding being connected to the auxilary cathode of said second tube and to the grid of said first tube.

9. An inverter circuit as defined in claim 8, characterized further by said secondary winding being center-tapped, and a second source of unidirectional voltage having its positive terminal connected to said main cathodes and its negative terminal connected to the center tap on said secondary winding.

10. An inverter circuit comprising a pair of gas tubes each having an anode, a grid, a main cathode, an auxiliary cathode, and a constricting electrode surrounding a portion of said auxiliary cathode, output means coupled to said anodes, means including a portion of said output means to apply a source of unidirectional voltage between the main cathode and anode in each of said tubes, and A. C. input means having two output terminals, the grid and auxiliary cathode of each of said tubes being cross coupled to different ones of said two output terminals.

11. An inverter circuit as defined in claim 10 wherein said A. C. input means comprises a transformer having a secondary winding, and said output terminals comprise the ends of said secondary winding.

References Cited in the file of this patent

UNITED STATES PATENTS

| 2,284,389 | Hansen | May 26, 1942 |
| 2,456,754 | Sziklai | Dec. 21, 1948 |